United States Patent [19]

Algeo et al.

[11] Patent Number: 5,517,197
[45] Date of Patent: May 14, 1996

[54] MODULAR RADAR ARCHITECTURE FILM (FM/CW OR PULSE) FOR AUTOMOBILE COLLISION AVOIDANCE APPLICATIONS

[75] Inventors: Jerry A. Algeo, Villa Park; Douglas K. Waineo, Placentia; Pileih Chen, Huntington Beach; Sam H. Wong, Yorba Linda; Russell H. Linstrom, Fullerton, all of Calif.

[73] Assignee: Rockwell International Corporation, Seal Beach, Calif.

[21] Appl. No.: 327,747

[22] Filed: Oct. 24, 1994

[51] Int. Cl.[6] ................................................ G01S 13/02
[52] U.S. Cl. .......................... 342/70; 342/21; 342/130; 342/194; 342/195; 342/201
[58] Field of Search .............................. 342/21, 70, 71, 342/72, 130, 194, 195, 200, 201

[56] References Cited

U.S. PATENT DOCUMENTS

| | | | |
|---|---|---|---|
| 4,308,536 | 12/1981 | Sims, Jr. et al. | 342/70 |
| 5,130,714 | 7/1992 | Taylor | 342/201 |
| 5,134,411 | 7/1992 | Adler | 342/70 |
| 5,268,692 | 12/1993 | Grosch et al. | 342/70 |

*Primary Examiner*—Harold J. Tudor
*Attorney, Agent, or Firm*—George A. Montanye; David J. Arthur; Philip K. Yu

[57] ABSTRACT

A modular radar system using both FM/CW and pulse waveforms for automotive collision avoidance applications. The radar system comprises a transmit and a receive antenna for transmitting and receiving, respectively, either one of FM/CW waveform and pulse waveform, a voltage-controlled oscillator (VCO) for generating a pre-set waveform for the transmit antenna, a modulator for modulating the pre-set waveform of the VCO, a switch for allowing the pre-set waveform from the VCO to be transmitted for a predetermined interval so as to generate the pulse waveform, a timing generator for causing the modulator to execute through a pre-set sequence of frequencies for either one of the pulse and FM/CW modes of waveforms with the timing generator controlling the transmission of one of the FM/CW waveform and pulse waveform, a balanced mixer for signal conversion In both FM/CW and pulse modes, an IF/Baseband receiver for amplifying the received FM/CW waveform and for IF-amplifying the received pulse waveform to generate an in-phase and a quadrature baseband output, a coherent oscillator for generating a coherent oscillating signal of a predetermined frequency to the receiver for centering the IF-amplified received pulse waveform at the predetermined frequency during pulse mode, and a frequency control loop for causing the VCO to maintain an offset by a predetermined frequency in the pulse mode between receive and transmit.

10 Claims, 1 Drawing Sheet

5,517,197

MODULAR RADAR ARCHITECTURE FILM (FM/CW OR PULSE) FOR AUTOMOBILE COLLISION AVOIDANCE APPLICATIONS

RELATED FIELD

The present invention relates to radars and more specifically to modular radar architectures for automobile collision avoidance, station keeping, platooning and intelligent cruise control applications.

ART BACKGROUND

Radars for automobile collision avoidance applications present a relatively novel use of the well-known radar technology, especially in the area of Intelligent Vehicle Highway System (IVHS). One possible application is for creating intelligent cruise control, where in the event of a someone suddenly pulling in front of a driver's vehicle on cruise control, the cruise control can sense the intrusion and drop back without interrupting its pre-set cruising speed. For collision avoidance applications, the radar system can give a driver warning, if the driver is driving too fast for the surrounding conditions. The system may even activate the brakes to automatically adapt the vehicle speed to the conditions. However, to be more intelligent, more signal analysis is needed such that the driver does not receive a warning every time a totally innocuous object is encountered.

Radars suitable for automobile applications generally require two types of millimeter-wave (MMW) radar architectures for generating either an FM/CW (frequency-modulated continuous wave) or a pulse waveform, but rarely both. Conventional approaches to implement these two radar architectures require individual radar sub-systems with no commonality in design to be independently implemented. As such, developmental costs associated with having two radar systems are not shared through common hardware modules. Therefore, it would be desirable to implement a radar architecture which provides sub-system modularity and flexibility to be either an FM/CW or a pulse radar. Further, the optimized common hardware can be shared among systems designed for various automobile OEM's.

An FM/CW radar has been known to have the advantage of achieving high sensitivity with low transmitter power, as well as good range resolution as a function of the modulation. A pulse radar generally has the advantage of achieving unambiguous range measurement, whereas the FM/CW radar does not. For example, a pulse radar can measure the range of a moving automobile being tracked without much ambiguity, whereas an FM/CW radar's tracking can easily get confused, especially by any additional moving objects on the road. With simple processing of the pulse waveform, the slight ambiguity can be removed.

SUMMARY OF THE PRESENT INVENTION

Therefore, it is an object of the present invention to have a radar architecture which takes advantage of the beneficial attributes of both FM/CW and pulse radars.

Also, it is an object of the present invention to have a radar architecture capable of being flexible in terms of the modular FM/CW and pulse radar sub-systems.

Further, it is an object of the present invention to have a radar architecture with sub-system modularity for either an FM/CW or a pulse radar.

A modular radar system using both FM/CW and pulse waveforms for automotive collision avoidance applications is disclosed. The radar system comprises a transmit and a receive antenna for transmitting and receiving, respectively, either one of FM/CW waveform and pulse waveform, a voltage-controlled oscillator (VCO) for generating a pre-set waveform for the transmit antenna, a modulator for modulating the pre-set waveform of the VCO, a switch for allowing the pre-set waveform from the VCO to be transmitted for a predetermined interval so as to generate the pulse waveform, a timing generator for causing the modulator to execute through a pre-set sequence of frequencies for either one of the pulse and FM/CW modes of waveforms with the timing generator controlling the transmission of one of the FM/CW waveform and pulse waveform, a balanced mixer for signal conversion in both FM/CW and pulse modes, an IF/Baseband receiver for amplifying the received FM/CW waveform and for IF-amplifying the received pulse waveform to generate an in-phase and a quadrature baseband output, a coherent oscillator for generating a coherent oscillating signal of a predetermined frequency to the receiver for centering the IF-amplified received pulse waveform at the predetermined frequency during pulse mode, and a frequency control loop for causing the VCO to maintain an offset by a predetermined frequency in the pulse mode between receive and transmit.

BRIEF DESCRIPTION OF THE DRAWINGS

Additional objects, features and advantages of the present invention will become apparent in the following description, wherein.

DETAILED DESCRIPTION OF THE DRAWINGS

Figure 1:
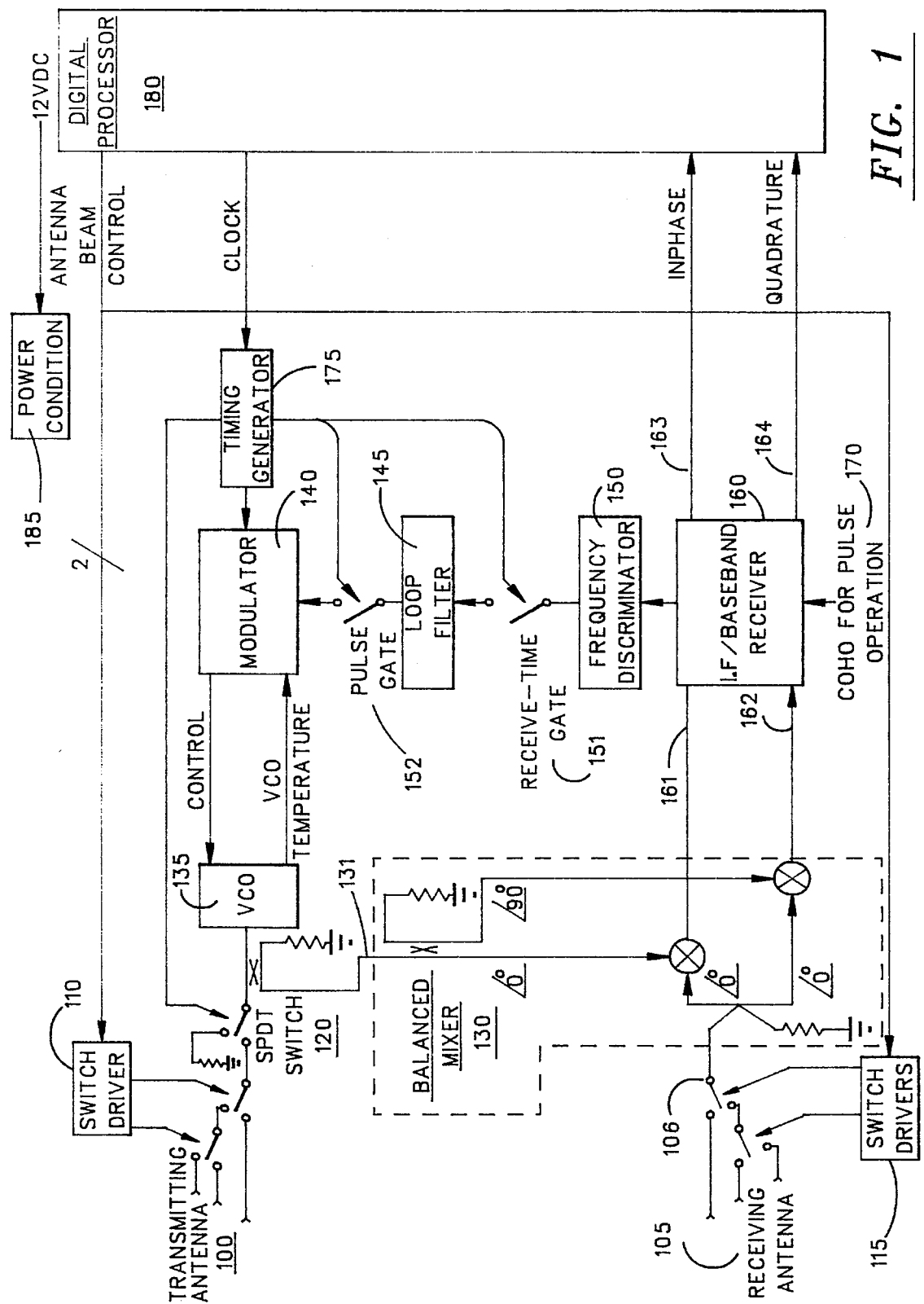
FIGURE 1 is a system block diagram of a modular radar system in accordance with the present invention.

A modular radar architecture for automobile collision avoidance applications is disclosed. The detailed descriptions which follow are presented largely in terms of algorithms and symbolic representations of operations within a computer system. These algorithmic descriptions are representations of the means used by those skilled in the data processing arts to most effectively convey the substance of their work to others skilled in the art.

Reference is to FIG. 1, where the block diagram of a modular radar system in accordance with the present invention is illustrated. A three-beam transmitting antenna 100 is driven by a switch driver 110 coupled to a digital processor 180. The digital processor 180 is coupled to a voltage-controlled oscillator (VCO) 135 through a modulator 140 and a timing generator 175. On the receiving end, a three-beam receiving antenna 105 is switched by a switch driver 115 coupled to the digital processor 180. The receiving antenna 105 is coupled, through a balanced mixer 130, to an intermediate-frequency (IF)/Baseband receiver 160. The IF/Baseband receiver 160 is coupled to the modulator 140 through a frequency discriminator 150 and a loop filter 145, which are both timed by the timing generator 175. Additionally, a power conditioner 185 may be used to adapt the typical 12-volt power source from the automobile's battery and alternator to the radar system of the present invention.

ANTENNA

Referring to FIG. 1, separate antennae 100 and 105 are used for transmission and reception mainly for the reason that in the FM/CW waveform mode, the transmitter is typically operating all the time. If a single antenna is used, a portion of the transmit signal will be coupled into the receive channel, which would introduce coupling problems between the transmit and receive signals. A single antenna, however, would have been sufficient for a pulse-only system, which generally does not have its transmitter operate during reception.

Currently, the antennae operate with three (3) beam positions to keep track of vehicles, as well as obstacles, to the left, center and right of the its current position. However, those skilled in the art may find a scanning antenna with a mechanical gimbal more suitable for their specific application.

SWITCH DRIVER

The switch driver 110 selects the beam position of the transmitting antenna 100 by switching in the horizontal plane to produce a beam that is displaced to the right, to the center and to the left of the center position. Each of the three beams Is generally identical in terms of their antenna patterns with slight differences mainly in the outside beams. Their object is to keep track of the surroundings of the vehicle and to allow the radar system software to analyze the situation.

SPDT SWITCH

The SPDT (single-pole double-throw) switch 120 operates the pulse mode radar by causing a narrow pulse, generally in the range of 30 to 50 nanoseconds, to be transmitted. To do so, the SPDT switch 120 connects the VCO 135 to the transmitting antenna 100 only during that very brief interval through the timing generator 175. Also, for pulse operations, the SPDT switch 120 is used to gate the transmit signal so that it is off during receive-time.

For FM/CW mode of operations, the SPDT switch 120 would connect the VCO 135 to the transmitting antenna 100 all the time.

VCO AND MODULATOR

The VCO 135 is the primary signal generator, of which the frequency is controlled by the modulator 140 and ultimately by the digital processor 180. The transmit power is generally required to be on the order of 15–20 mW for a typical implementation. The modulator 140, which may contain a read-only memory ("ROM") storing a fixed set of frequencies, controls the waveforms generated by the VCO. The ROM may be used to linearize the tuning curve of the VCO 135 as a function of temperature, which is sensed by a probe. Based on the VCO temperature and the required frequency, the ROM can provide the correct modulator drive for linear VCO operation.

For the FM/CW operation, the modulator 140 may output a variable frequency wave shape, which causes the VCO 135 to generate a precise frequency-modulated waveform. The frequency can be either in steps or essentially continuous, depending on the update rate. For the pulse operation, the modulator 140 outputs a constant frequency during "receive-time", which extends from the end of the transmit pulse to the beginning of the next pulse.

It should be noted that the millimeter wave components, such as the switches, the VCO and the modulator, are generally readily available as "off-the-shelf" parts. However, those skilled in the art will appreciate that some parts may be more cost-efficiently acquired through custom-designed parts as microwave integrated circuits.

TIMING GENERATOR

The timing generator 175, coupled to the modulator 140, is used to cause the modulator 140 to sequence through its pre-set sequence of frequencies for both FM/CW and pulse-modes.

RECEIVE CHANNEL

The receiving antenna 105, similar to its transmitting counterpart, is switched by the switch driver 115 to select the beam positions for reception.

BALANCED MIXER

The balanced mixer 130 is used for both FM/CW and pulse operations, during receive time, to down-convert received signals to intermediate frequency (IF). For the FM/CW operation, the IF frequency may be zero Hz. For the FM/CW and/or pulse operation, the IF frequency may be higher, 100 MHz for example. The IF signal can then be filtered, amplified, and down-converted by an IF/Baseband receiver 160 to in-phase 163 and quadrature 164 baseband signals (with the help of a coherent detector 170 in the pulse mode).

Currently, for the FM/CW operation, the balanced mixer 130 performs a direct conversion of the received FM/CW waveform to baseband. In this case, the frequency control loop may be used to linearize the tuning curve of the VCO 135 to augment or supplant the ROM-based linearization described previously.

For pulse operations during "receive time", the VCO output is also used to down-convert received signals to IF. During "transmit time", the modulator 140 drives the VCO 135 so that its frequency is shifted by an amount equal to the IF. If the transmitter frequency is about 76 ½ GHz during transmit time, then an offset signal 131 coupled from the VCO 135 is used to offset the received signal 106 by, for example, 100 MHz during receive time. With the balanced mixer 130, both signals 161 and 162 out of the balanced mixer 130 are maintained centered within the IF bandwidth by the use of a frequency control loop (to be described). Therefore, for pulse mode, the received signal 106 is down-converted to the IF for the IF/Baseband receiver 160 such that the receiver 160 can operate just like a superheterodyne receiver.

IF/BASEBAND RECEIVER

The IF/Baseband receiver 160 may operate as a DC amplifier for the FM/CW mode and an IF amplifier for the FM/CW and/or pulse mode. A COHO (Coherent Oscillator) signal 170 (with fixed oscillation) is applied after the IF gain in the pulse mode to down-convert the pulse data to baseband. The in-phase signal 163 and quadrature signal 164 are generated by the receiver 160 as coherent signals for both FM/CW and pulse modes. With coherent baseband signals, the size of the target can be known, as well as the phase of the target relative to the transmitted frequency.

For example, if the echoed signal is received at 77 GHz, the in-phase and quadrature signals may indicate that the phase of the signal is at 22 degrees. That is, although there may have been a million cycles of 77 GHz between the transmit signal and the receive signal, the phase of the receive signal can be measured to 22 degrees. Changing the frequency would result in different angles, which allow the range and velocity of the target to be determined by the sequence of phases for the FM/CW mode.

For the pulse waveform, assuming the FM/CW mode is selectively operating, coherent signal processing need not to be done for the pulse channels so that the algorithms for the pulse channel In the digital processor 180 can be simplified. The pulse channel, however, may be used to provide a "sanity check" on the data obtained from the FM/CW system. Although the FM/CW system may also be used as a "sanity check" on the pulse system, the resulting software for the pulse system tends to be more intense, thus cutting its through-put. Those skilled in the art can readily determine their system for their particular need.

Currently, the FM/CW waveform is used for a given time interval and the target data would be processed based on the FM/CW waveform. If a potential ambiguity occurs, the system may switch to the pulse waveform to resolve the ambiguity. Also, the pulse waveform may be automatically sequenced into the FM/CW waveform steps.

DIGITAL PROCESSOR

The digital processor 180, as shown in FIG. 1, provides control for the antenna beams, generates clocks for the timing generator 175 and process the in-phase and quadrature signals 163, 164. The algorithm of the processor can be simplified by using mainly the FM/CW waveform while keeping the pulse algorithm as a check.

POWER CONDITIONER

The power conditioner 185 may be beneficially used to filter the power supplied by the automobile power source, which tends to be noisy under operating conditions.

FREQUENCY CONTROL LOOP—FREQUENCY DISCRIMINATOR AND LOOP FILTER

In the pulse mode, to superheterodyne process the IF signals 161 and 162 from the balanced mixer 130, the signals coming out of the balanced mixer 130 are centered at the COHO 170 frequency. The frequency control loop, comprising a frequency discriminator 150 and a loop filter 145, is used, during pulse operations, to ensure that the VCO 135 is offset during receive time by the IF such that the received signals may be centered within the IF bandwidth. One of the main reasons for the control loop is that, for pulse mode, the actual frequency of the receive signal 106 needs to be known, whereas the FM/CW system typically requires only the frequency increment or the slope of the frequency as it goes up and down.

The frequency discriminator 150 measures how far off the actual IF frequency from the COHO 170 is. If there is an error between the actual IF frequency and the desired IF frequency, a correction voltage is applied to the modulator 140. Essentially, it is a frequency feedback loop which controls the frequency of the VCO 135 during the pulse system transmit time so that during receive time, the VCO 135 will be offset by an exact frequency to allow superheterodyne processing.

The "receive time" gate 151 is used to collect frequency misalignment data only when received echoes are present. The pulse gate 152 is used to offset the VCO frequency only during the transmit pulse. Generally, the frequency control loop, i.e. the frequency discriminator 150, the receive time gate 151, the loop filter 145, and the pulse gate 152 are required only for pulse operations.

A modular radar architecture in accordance with the present invention takes advantage of the attributes from both the pulse and FM/CW systems. More importantly, it allows the radar to switch between one and the other in real time in automotive collision avoidance applications to reduce false alarm rate, as well as optimize the signal detection probabilities. For example, the shortcomings associated with using only an FM/CW waveform in a automotive radar can be rectified by the simple processing of a pulse waveform. As such, the "holes" in a typical FM/CW situation can be filled by the use of a simple pulse radar.

The algorithm used in the digital processor 180 for an FM/CW waveform can easily be implemented as will be appreciated by those skilled in the art. For example, a step-frequency or "ramp-frequency" algorithm may be used for the FM/CW operation. Similarly, because the pulse system is implemented as a "sanity check" or "ambiguity resolver" of the FM/CW results, the algorithm required is also readily available to those skilled in the art.

What is claimed is:

1. A modular radar system for automotive collision avoidance applications, comprising:

a transmit antenna for transmitting one of FM/CW waveform and pulse waveform;

a receive antenna for receiving one of FM/CW waveform and pulse waveform;

a voltage-controlled oscillator (VCO) coupled to said transmit antenna for generating a predetermined waveform for said transmit antenna;

a modulator coupled to said VCO for modulating said predetermined waveform of said VCO;

a switch coupled between said VCO and said transmit antenna for allowing said predetermined waveform from said VCO to be transmitted for a predetermined interval so as to generate said pulse waveform;

a timing generator disposed to cause said modulator to execute through a pre-set sequence of frequencies for either one of pulse and FM/CW modes of waveforms, said timing generator also coupled to said switch for controlling the transmission of one of said FM/CW waveform and pulse waveform;

a balanced mixer coupled to said receive antenna for signal conversion, said balanced mixer operative in said FM/CW mode by converting a received FM/CW waveform to a baseband signal, said balanced mixer operative in said pulse mode by converting a received pulse waveform to an IF signal;

an IF/Baseband receiver coupled to said balanced mixer for amplifying said received FM/CW waveform and for IF-amplifying said received pulse waveform, generating an in-phase and a quadrature baseband output;

a coherent oscillator coupled to said IF/baseband receiver for generating a coherent oscillating signal of a predetermined frequency to said receiver for centering said IF-amplified received pulse waveform at said predetermined frequency during pulse mode; and a frequency control loop coupled between said IF/Baseband receiver and said modulator for causing said VCO to maintain an offset by a predetermined frequency in said pulse mode between receive and transmit.

2. A radar system according to claim 1, further comprising:

a digital processor for providing clocking to said timing generator and for analyzing said in-phase and quadrature outputs from said balanced mixer.

3. A radar system according to claim 1, further comprising:
   a first switch driver coupled to said transmit antenna for selecting from a plurality of beam positions;
   a second switch driver coupled to said receive antenna for selecting from a plurality of beam positions.

4. A radar system according to claim 3, further comprising:
   a power conditioner for providing a power source to said radar system from the automobile.

5. A radar system according to claim 1, wherein said frequency control loop comprises:
   a frequency discriminator coupled to said IF/Baseband receiver for determining the frequency offset between said coherent oscillating signal and said received pulse waveform;
   a loop filter coupled to said frequency discriminator for correcting said modulator when said frequency offset exists between said coherent oscillating signal and said received pulse waveform.

6. A method for a modular radar system for automotive collision avoidance applications, comprising the steps of:
   a) transmitting through a transmit antenna one of FM/CW waveform and pulse waveform;
   b) receiving through a receive antenna one of FM/CW waveform and pulse waveform;
   c) generating a predetermined waveform through a voltage-controlled oscillator (VCO) coupled to said transmit antenna for said transmit antenna;
   d) modulating through a modulator coupled to said VCO said predetermined waveform of said VCO;
   e) allowing said predetermined waveform from said VCO to be transmitted for a predetermined interval through a switch coupled between said VCO and said transmit antenna so as to generate said pulse waveform;
   f) said modulating caused by a timing generator disposed thereto execute through a pre-set sequence of frequencies for either one of pulse and FM/CW modes of waveforms, said timing generator also coupled to said switch for controlling the transmission of one of said FM/CW waveform and pulse waveform;
   g) signal converting by a balanced mixer coupled to said receive antenna, said balanced mixer operative in said FM/CW mode by converting a received FM/CW waveform to a baseband signal, said balanced mixer operative in said pulse mode by converting a received pulse waveform to an IF signal;
   h) amplifying said received FM/CW waveform and for IF-amplifying said received pulse waveform, through an IF/Baseband receiver coupled to said balanced mixer, to generate an in-phase and a quadrature baseband output;
   i) generating a coherent oscillating signal of a predetermined frequency to said receiver through a coherent oscillator coupled to said IF/baseband receiver for centering said IF-amplified received pulse waveform at said predetermined frequency during pulse mode: and
   j) causing said VCO to maintain an offset by a predetermined frequency, through a frequency control loop coupled between said IF/Baseband receiver and said modulator, in said pulse mode between receive and transmit.

7. The method according to claim 6, further comprising the step of:
   k) providing clocking through a digital processor to said timing generator and for analyzing said in-phase and quadrature outputs from said balanced mixer.

8. The method according to claim 6, wherein:
   step a) comprises selecting from a plurality of beam positions through a first switch driver coupled to said transmit antenna; and
   step b) comprises selecting from a plurality of beam positions through a second switch driver coupled to said receive antenna.

9. The method according to claim 8, further comprising the step of using a power conditioner to provide power to said radar system from the automobile.

10. The method according to claim 6, wherein said frequency control loop comprises:
    a frequency discriminator coupled to said IF/Baseband receiver for determining the frequency offset between said coherent oscillating signal and said received pulse waveform;
    a loop filter coupled to said frequency discriminator for correcting said modulator when said frequency offset exists between said coherent oscillating signal and said received pulse waveform.

* * * * *